US006109413A

United States Patent [19]

Young

[11] Patent Number: 6,109,413

[45] Date of Patent: Aug. 29, 2000

[54] FRICTION CLUTCH WITH ADJUSTING DEVICE

[75] Inventor: Alastair John Young, Kenilworth, United Kingdom

[73] Assignees: Automotive Products, PLC; Leamington Spa, both of United Kingdom

[21] Appl. No.: 09/180,668

[22] PCT Filed: Mar. 10, 1998

[86] PCT No.: PCT/GB98/00720

§ 371 Date: Nov. 12, 1998

§ 102(e) Date: Nov. 12, 1998

[87] PCT Pub. No.: WO98/41777

PCT Pub. Date: Sep. 24, 1998

[30] Foreign Application Priority Data

Mar. 15, 1997 [GB] United Kingdom .................. 97 05443

[51] Int. Cl.$^{7}$ ...................................................... F16D 13/75

[52] U.S. Cl. .................................. 192/111 A; 192/70.18; 192/70.25

[58] Field of Search ............................ 192/70.18, 70.25, 192/111 A

[56] References Cited

U.S. PATENT DOCUMENTS 5,509,518 4/1996 Zelikov ................................ 192/70.25

5,513,736 5/1996 Mizukami ........................... 192/111 A

*Primary Examiner*—Rodney H. Bonck
*Assistant Examiner*—Saúl Rodríguez
*Attorney, Agent, or Firm*—Paul E Milliken; Ray L Weber; Lee A Germain

[57] ABSTRACT

A friction clutch having a clutch cover assembly (20) including a cover (21) attached to a flywheel (11) with at least one spring (12) acting on a pressure plate (13) to force a driven plate (15) into frictional engagement with the flywheel. The clutch also includes a number of lift straps (14) acting to move the pressure plate (13) away from the driven plate (15) when the clutch is disengaged and also includes at least one constant lift mechanism (50) which ensures that the pressure plate moves away from the driven plate by substantially the same amount during each full disengagement operation of the clutch. The constant lift mechanism includes a sensing device (55) acting to sense wear of the driven plate (15) by contact with the flywheel (11), a pin (51) fixed relative to the pressure plate (13), a stop device (56) acting to restrict the lift movement of the pressure plate, and a one-way locking device (60) acting on the pin which allows one way movement of the stop device when driven plate wear occurs. The pin (51) may also be used to secure one of the lifts straps (14) to the pressure plate.

29 Claims, 6 Drawing Sheets

FRICTION CLUTCH WITH ADJUSTING DEVICE

FIELD OF HE INVENTION

The present invention relates to friction clutches which include constant lift mechanisms and in particular, though not exclusively, to automatically adjusting clutches and twin plate clutches.

BACKGROUND OF THE INVENTION

Friction clutches are known which comprise a clutch cover attached to a flywheel with at least one spring acting on a pressure plate to force a driven plate into frictional engagement with the flywheel. It is also known to provide such clutches in the form of twin plate friction clutches wherein the pressure plate is an intermediate pressure plate and the spring acts on the intermediate plate via a further pressure plate and a further driven plate. Furthermore, it is known to provide constant lift mechanisms in such clutches which restrict movement of the pressure plate or intermediate pressure plate away from the flywheel and the driven plate during disengagement of the clutch to a substantially constant distance.

It is an object of the present invention to provide an improve form of constant lift mechanism which is more compact than heretofore known constant lift mechanism. Additionally the constant lift mechanism may be capable of fulfilling additional fnctions within the clutch.

BRIEF SUMMARY OF THE INVENTION

This invention is a clutch cover assembly for a friction clutch comprising a clutch cover attachable to an associated flywheel, a pressure plate non-rotatably attached to the cover and at least on spring acting on the pressure plate in use to force an associated driven plate into frictional engagement with the associated fllywheel, the associated driven plate having frictional factings which are subject to wear due to repeated engagement and disengagement of the clutch, the pressure plate being attached to the clutch cover by a plurality of lift straps which act in use to move the pressure plate away from the associated driven plate when the clutch is disengaged, the cover assembly also including at least one constant lift mechanism comprising a stop which is axially adjustable in reponse to wear of the friction facings of the associated driven plate and which contacts an abutment on one of the pressure plate or an axially fixed component of the clutch cover assembly to limit movement of the pressure plate away from the associated driven plate to substantially the same amount during each full disengagement of the clutch, a part of the at least one constant lift mechanism securing a part of a respective lift strap to the pressure plate.

BRIEF OF THE VIEWS OF THE DRAWINGS

The invention will now be described by way of example only with reference to the accompanying drawings in which.

DETAILED DESCRIPTION OF THE INVENTION

Figure 1:
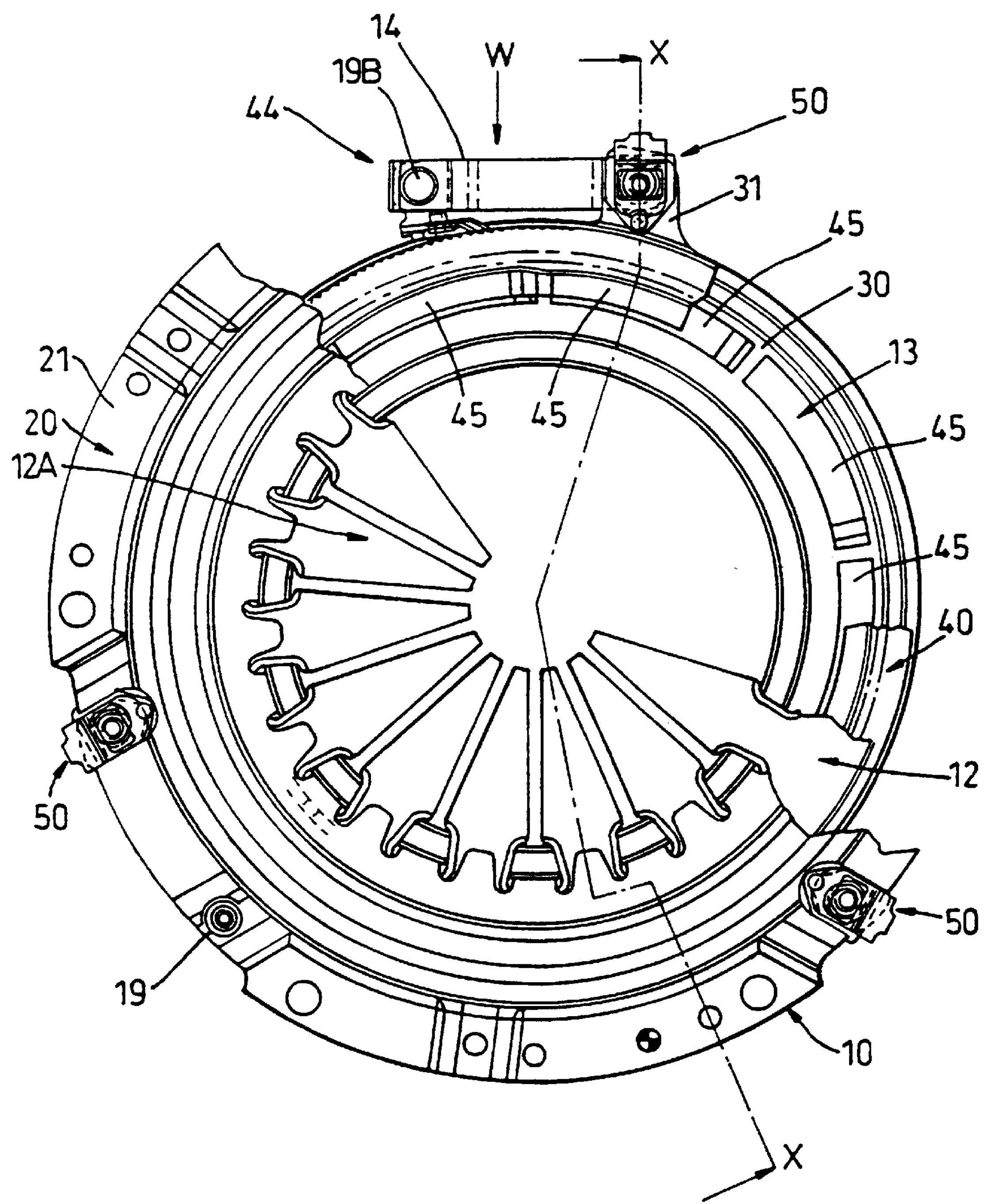
FIG. 1 is an axial cutaway view of a clutch cover assembly according to the present invention.
Figure 2:
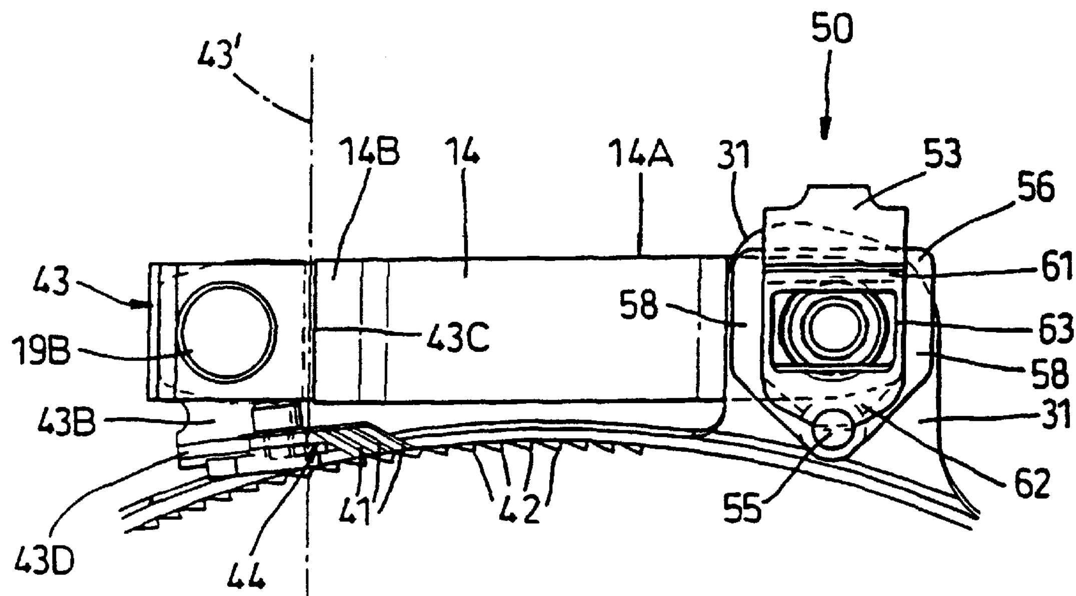
FIG. 2 is an enlarged view of part of FIG. 1.
Figure 3:
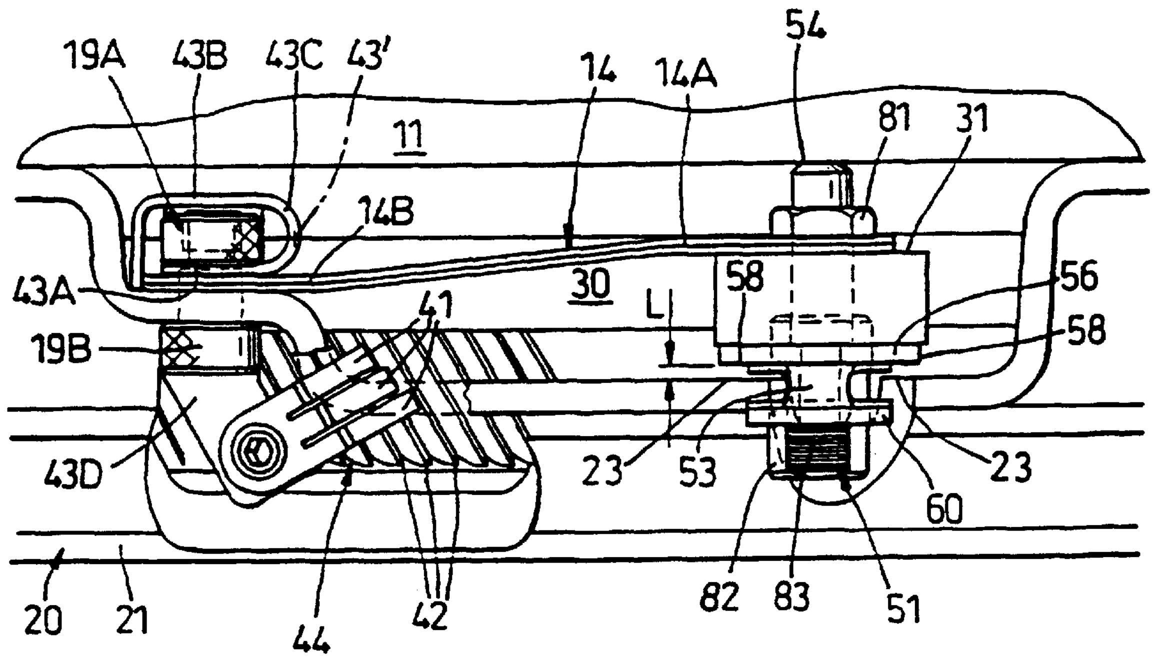
FIG. 3 is a radial view of FIG. 1 taken from the direction of arrow W including a flywheel.
Figure 4:
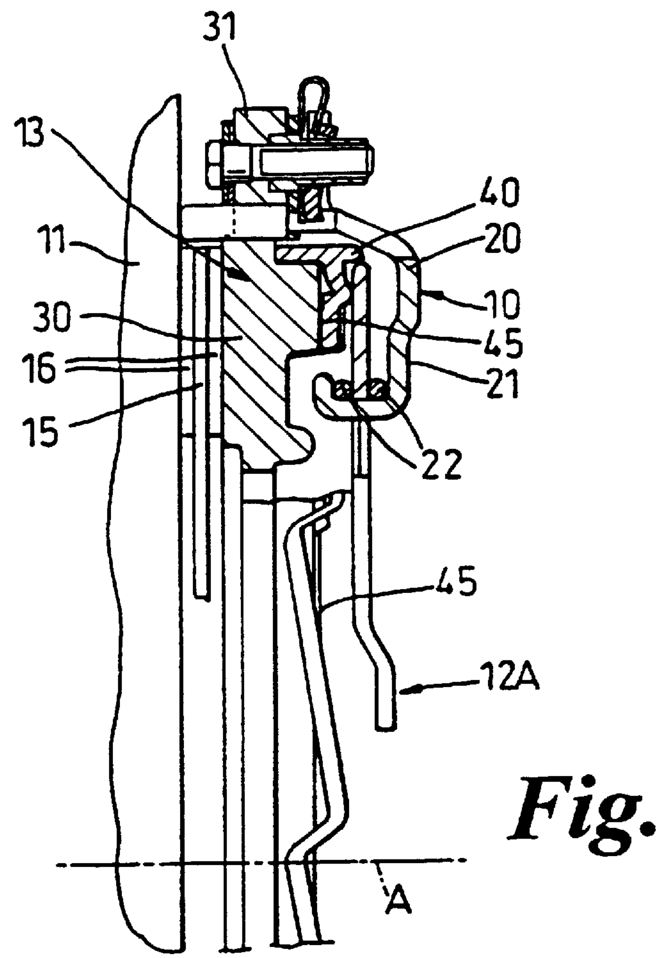
FIG. 4 is a partial cross section view of the clutch cover assembly of FIG. 1 and associated driven plate and flywheel taken along the line XX.
Figure 5:
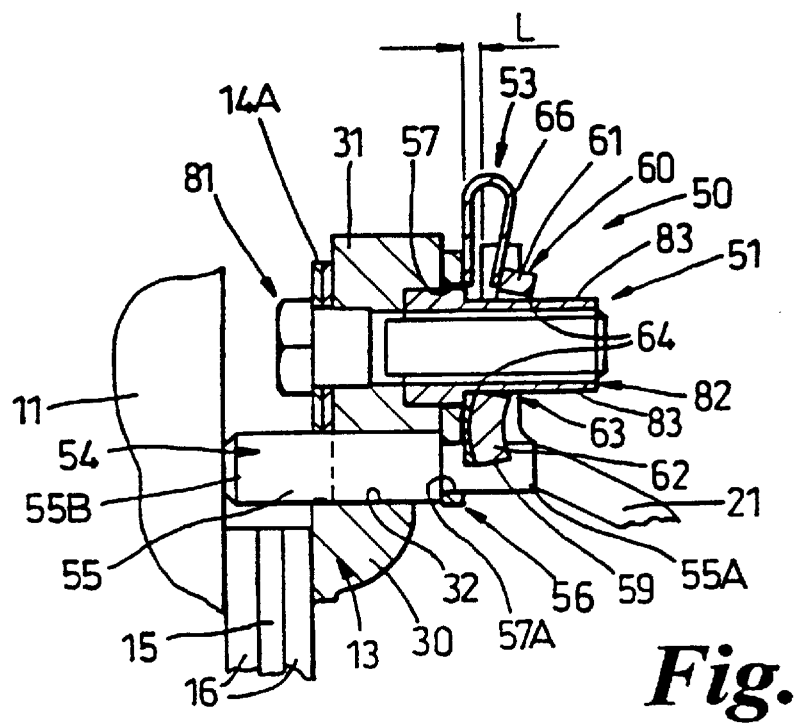
FIG. 5 is an enlarged view of part of FIG. 4.

With reference to FIGS. 1 to 5 there is illustrated a clutch 10 which includes a flywheel 11, a clutch cover assembly 20 and a driven plate 15. The flywheel 11 is fixed to the end of a crankshaft (not shown) of an associated internal combustion engine. In this case the clutch is an automatically adjusting clutch.

The clutch cover assembly 20 comprises a clutch cover 21, a diaphragm spring 12, a pressure plate 13, lift straps 14, one adjuster means 44 and three constant lift mechanisms 50. The clutch cover 21 is fixed rotationally and axially fast to the flywheel 11 by bolts (not shown) and supports the diaphragm spring 12 via two support rings 22 situated one on each axial side of the diaphragm spring 12 in a manner well known in the art. The diaphragm spring biases the pressure plate 13 towards the flywheel 11. The clutch driven plate 15 is situated between the pressure plate 13 and flywheel 11 and is connected to the input shaft of a gear box (not shown). When the clutch is engaged i.e. when the diaphragm spring 12 biases the pressure plate 13 towards the flywheel, clamping the driven plate 15, power can be transmitted between the associated engine and gearbox.

By applying an axial force to the fingers 12A of the diaphragm spring 12 in a direction towards the flywheel 11 the clutch can be dis-enzaged in a manner well known in the art.

The pressure plate 13 comprises a first part 30 coaxial with a second part in the form of a pivot ring 40. First part 30 is generally annular in shape and has significant thermal mass and is thus capable of absorbing heat generated by frictional contact with the adjacent friction facing 16 of the driven plate 15 during engagement and dis-engagement of the clutch 10. On the radially outer periphery of the first part 30 there are three circumferentially equi-spaced lugs 31. Each lug is fixed to one end 14A of a tangentially orientated lift strap 14 by a adjustment pin 51. The adjustment pin 51 comprises a bolt 81 and a nut 82 which clamp the lift strap 14 to the lug 31. Nut 82 has flat surfaces 83 on two of its sides. This allows for a spanner to tightening the nut and bolt. The other end 14B of the strap 14 is fixed to the clutch cover 21 by a rivet 19 or a nut 19A and bolt 19B. The straps 14 ensure the first part 30 remains concentric with and rotationally fast with the clutch cover 21 but allow axial movement of the first part 30 relative to the clutch cover 21. When the clutch is engaged the straps 14 are stressed and bias the first part 30 away from the flywheel. This biasing assists in separating the first part 30 from the driven plate 15 when the clutch is dis-engaged.

For a full explanation of the operation of the adjuster means 44 see the applicants co-pending International application PCT/GB96/02280. However in summary the operation is as follows:

Following a sufficient amount of wear of the clutch driven plate friction facings 16 one of the pawl teeth 41 carried on clutch cover 21 via spring 43 will move over the top of the helical tooth 42 it is resting on (teeth 42 are carried on the second part 40 of pressure plate 13) and will be biased into the valley between adjacent helical teeth. Upon subsequent dis-engagement of the clutch, the axial movement of the second part 40 of the pressure plate, and hence the helical tooth 42, causes the pawl tooth 41 to also move away from the flywheel in an arc by deforming curved portion 43C of spring 43 about an axis 43'. Spring 43 also has a flat portion 43A which is fixed to the cover 21 by nut 19A and bolt 19B (see FIGS. 2 and 3) and a parallel flat portion 43B from which support portion 43D extends on which pawl teeth 41 are mounted.

When the clutch clamp load is sufficiently low the spring 43 is sufficiently tensioned to cause the pawl tooth acting on the helical teeth 42 to rotate in a reverse direction about axis 43' and hence cause the second part 40 of the pressure plate 13 to rotate relative to the first part 30 about axis A. The first and second parts of the pressure plate have facing ramps 45 and as relative rotation occurs the effective thickness of the pressure plate 13 increases to compensate for the reduction in thickness of the driven plate friction facings 16.

Each constant lift mechanism 50 is attached to an associated lug 31 of first part 30 of the pressure plate 13 and are all identical, and therefore only one will be described in detail:

The constant lift mechanism (see FIG. 5) comprises an adjustment pin 51 a locking plate 60, a spring 53 and a sensing device 54.

The sensing device 54 consists of a sensing pin 55 secured fast to a sensing plate 56. The sensing plate 56 lies parallel to the flywheel and has a central hole 57 which is a clearance fit on the adjustment pin 51. The sensing plate 56 lies on the side of the lug 31 remote from the flywheel 11. The sensing pin 55 lies generally parallel to the axis of rotation of the clutch A and is secured adjacent one of its ends 55A to the sensing plate 56 by a being an interference fit in a second hole 57A in the plate 56. Furthermore the end 55A also has a slot 59.

The sensing pin 55 passes through, and is a clearance fit in, a hole 32 in the associated lug 31 and, with the clutch engaged, end 55B of pin 55 contacts the flywheel 11. The sensing device 54 is therefore able to move axially relative to lug 31 and pin 51.

Spring 53 has a central hole which is a clearance fit on the pin 51 and also has a tab 66 bent through 180 degrees in the shape of a "u". It is the resilience of the material that causes the "u" shape portion of the spring 53 to act as a spring and bias the locking plate 60 away from the sensing plate 56.

Locking plate 60 is mounted via a central rectangular hole 63 on pin 51 and is of generally rectangular shape with a tab 61 which is biased away from the sensing plate 56 by spring 53. The locking plate 60 is restrained from moving away from the sensing plate because a second tab 62 remote from tab 61, is situated in the slot 59 of the sensing pin 55. This causes the locking plate 60 to tip sufficiently such that edges 64 of the locking plate 60 contact the pin 51.

Operation of one of the constant lift mechanism is as follows (the operation of the other constant lift mechanisms being identical):

1. With a new clutch and unworn driven plate and with the clutch engaged, the end 55B of the sensing pin 55 of the sensing device 54 is in contact with the flywheel 11.
2. When the clutch is disengaged the lift straps 14 move the pressure plate 13 and constant lift mechanism 50 away from the flywheel, dis-engaging pin end 55B from the flywheel.
3. After the pressure plate has moved axially by the predetermined lift L (see FIG. 3) flanks 58 of sensing plate 56 contact corresponding clutch cover stop abutment 23 and further axial movement of the sensing device is not possible.
4. The lift strap 14 continues to bias the pressure plate and adjustment pin 51 away from the flywheel but this biasing only accentuates the tipping action of the locking plate, causing edges 64 to attempt to dig into the flats on pin 51 and resist further axial movement of the pressure plate. Thus the pressure plate is also limited to the lift distance L.
5. Re-engagement of the clutch causes the components to return to their pre-disengagement position.

However following wear of the friction facings 16 the operation of the constant lift mechanism during re-engagement of the clutch is as follows:

1. The diaphragm spring II moves the pressure plate towards the flywheel.
2. The sensing pin 55 contacts the flywheel.
3. Continued movement of the pressure plate and adjustment pin 51 towards the flywheel is possible since the tilting of locking plate 60 due to the movement of sensing pin 55 to the right as viewed in FIG. 5 means that the edges 64 of plate 60 are not forced into engagement with the pin 51 and the pin 51 can move towards the flywheel relative to sensing plate 56, spring 53 and locking plate 60.
4. Movement of the pressure plate towards the flywheel stops when the friction facings are fully clamped.
5. On subsequent disengagement of the clutch the movement of the pressure plate away from the flywheel is again limited to distance L as described above since edges 64 of locking plate 60 (in its new position) grip pin 51. Thus as the friction facings 16 wear the pins 51 move towards the flywheel but the disengagement movement of the pressure plate remains at distance L. This prevents over adjustment of the friction facing wear by the adjuster means 44.

Figure 6:
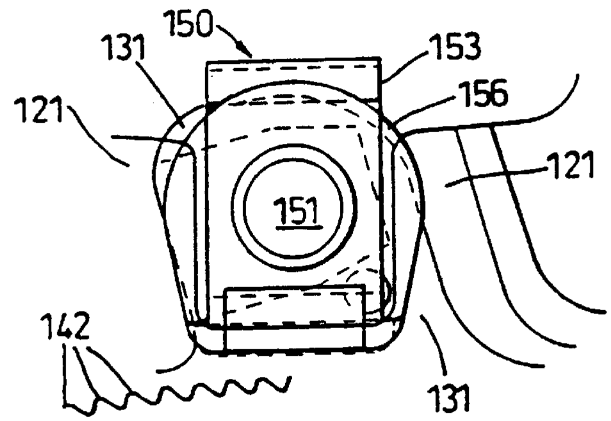
FIG. 6, 7 and 8 are views similar to FIGS. 2, 5 and 3 respectively showing a second embodiment of a constant lift mechanism.
Figure 7:
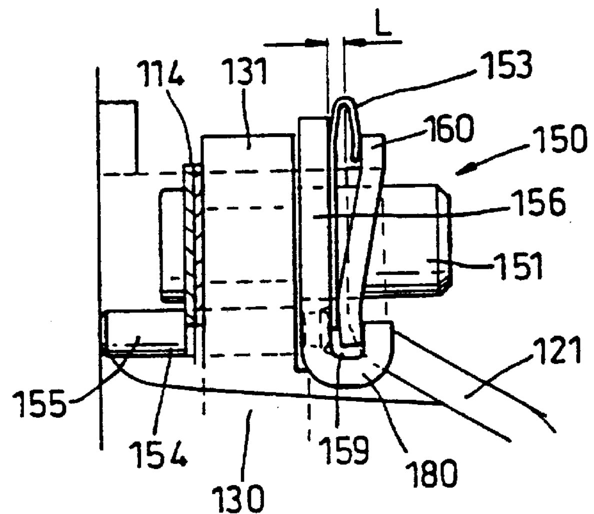
Figure 8:
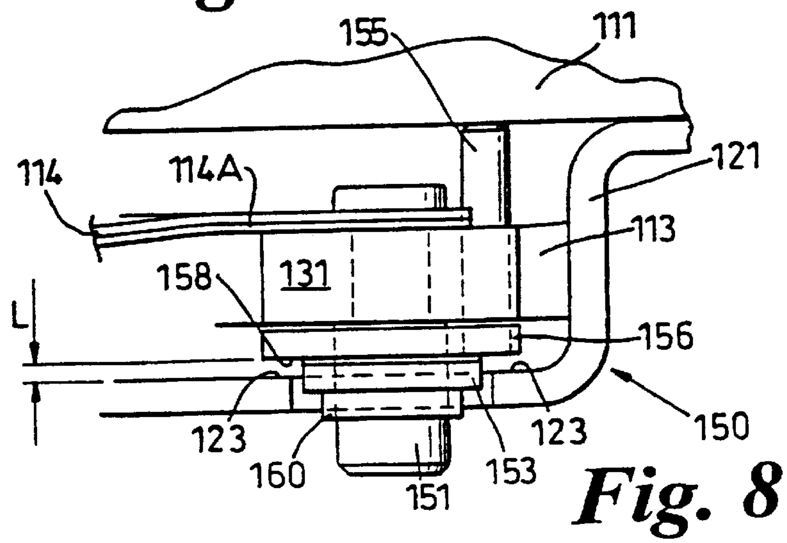

FIG. 6 to 8 shows an alternative form of constant lift mechanism 150 in which components which fulfil similar functions to the constant lift mechanism 50 are labelled 100 greater. In this case the adjustment pin 151 is in the form of a rivet which is fast with the associated lug 131 and also secures the end 114A of the lift strap 114 to the associated lug. Sensing plate 156 has a tab 180 bent through 180 degrees in the shape of a U and forming a slot 159. The pin 155 does not project beyond the plate 156 and is attached to the plate by a peening operation. The sensing plate 156, spring 153 and locking plate 160 progressively move along pin 151 as the driven plate wears.

Figure 9:
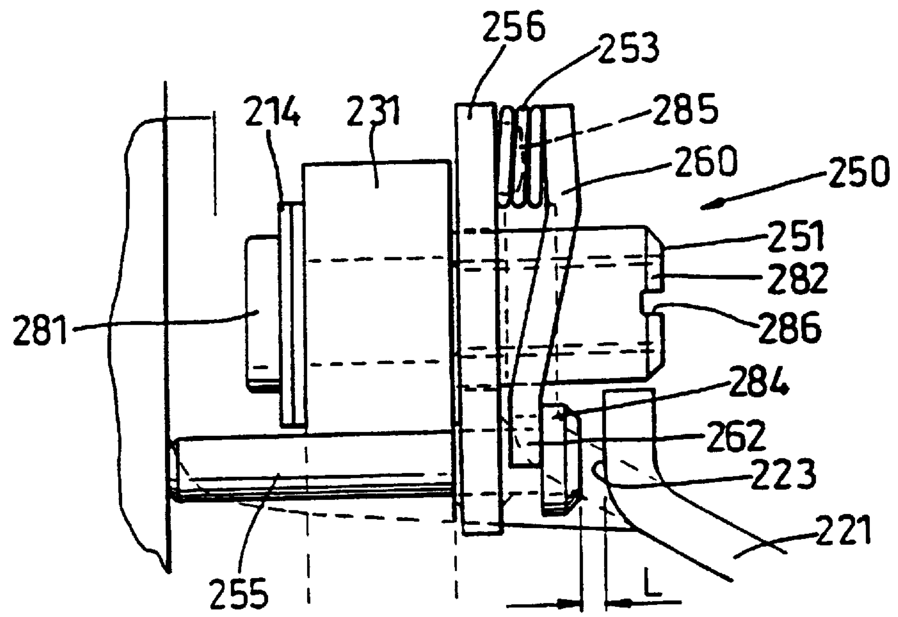
FIGS. 9 and 10 show views similar to FIG. 5 of a third and fourth embodiment respectively of a constant lift mechanism.

FIG. 9 shows a further alternative form of constant lift mechanism in 250 in which components which fulfil similar functions to the constant lift mechanism 50 are labelled 200 greater. In this case the tab 262 is located between the head 284 of sensing pin 255 and the sensing plate 256. Tab 262 has a semi circular cut out to allow it to miss the sensing pin 255. Also the spring 253 is a coil spring mounted on a projection 285 of the sensing plate 256 and the adjustment pin 251 is in the form of a nut 282 and bolt 281. Nut 282 has a screw driver slot 286 to allow for tightening. Furthermore the head 284 of the pin acts to limit axial movement of the constant lift mechanism by contact with abutment 223. Sensing plate 256, spring 253 and locking plate 260 move along pin 251 as the driven plate wears.

Figure 10:
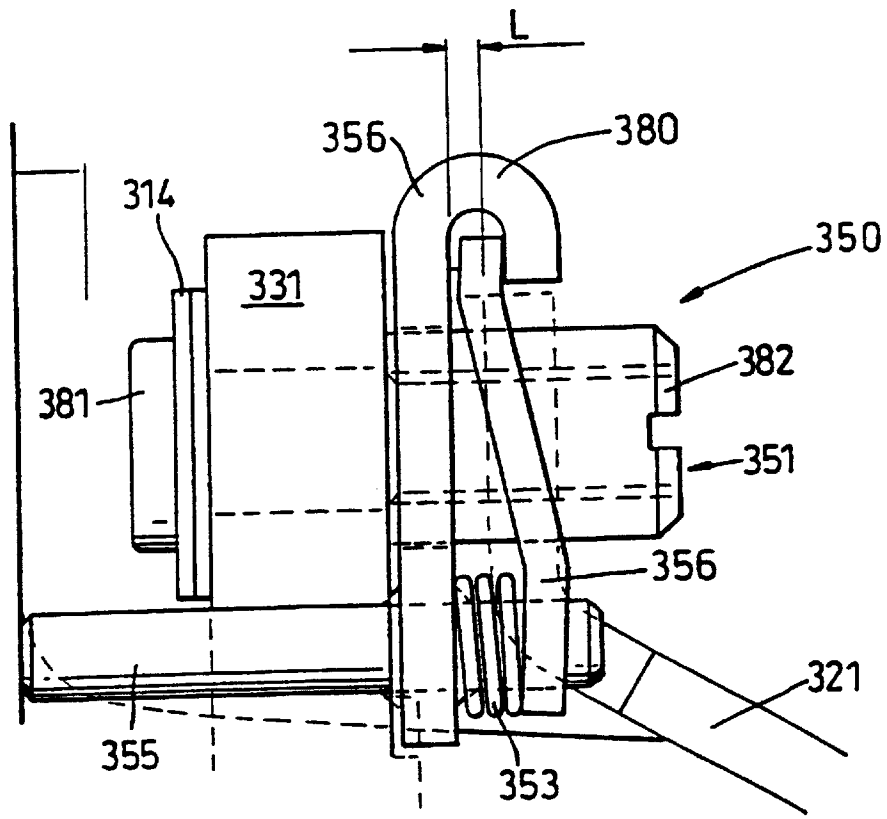

FIG. 10 shows a still further alternative form of constant lift mechanism 350 in which components which fulfil similar functions to the constant lift mechanism 50 are labelled 300 greater. In this case there is a coil spring 353 located on an extension of the sensing pin 355 and a tab 380 of the sensing plate 356 is bent into a U shape and is located radially outboard of the adjusting pin 351. The adjusting pin 351 is in the form of a nut 382 and bolt 381. Sensing plate 356, spring 353 and locking plate 360 move along pin 351 as the driven plate wears.

Figure 11:
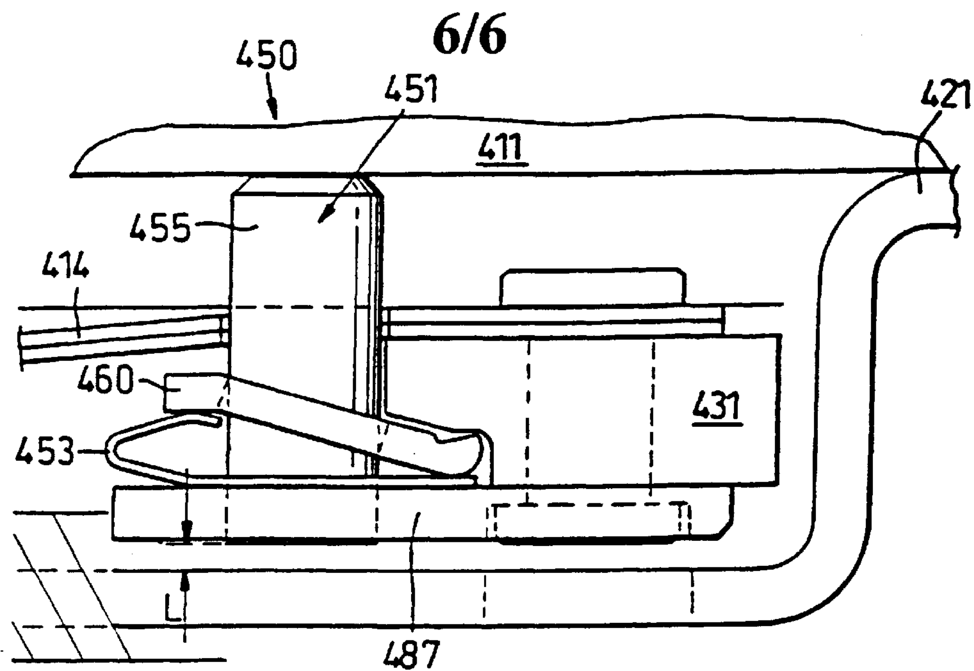
FIGS. 11 and 12 show views similar to FIG. 3 of a fifth and sixth embodiment respectively of a constant lift mechanism.
Figure 12:
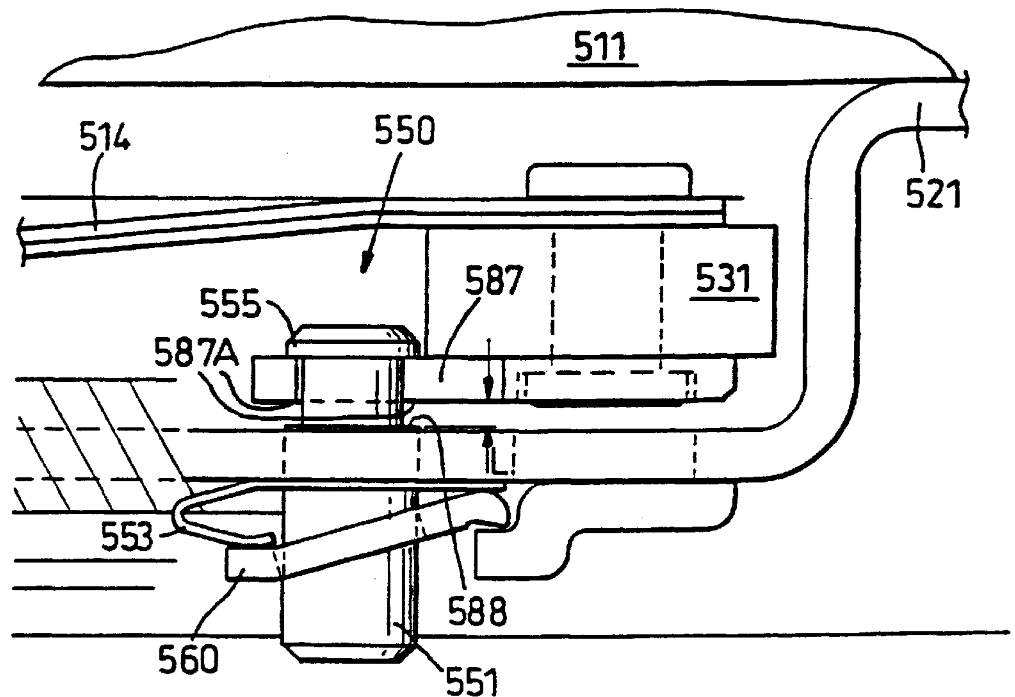

FIGS. 11 and 12 shows further alternative forms of constant lift mechanisms 450 and 550 in which components which fulfil similar functions to the constant lift mechanism 50 are labelled 400 and 500 greater respectively. In both cases the constant lift mechanisms are situated substantially between the ends of lift strap 414 and 514 respectively. In constant lift mechanism 450 the adjuster pin 451 passes through the lift strap 414 to sense wear by contact with the flywheel and moves away from flywheel 411 through plate 487 mounted on lug 431 as the driven plate wears with the constant lift L being established between the end 451*a* of pin 451 and the inside of cover 421. Locking plate 460 grips pin 451 to prevent movement of pin through plate 487 in a direction towards flywheel 411.

In the constant lift mechanism 550 the pin 551 is mounted on cover 521 and has a head 555 which acts to sense wear by abutment with plate 587, which is rivetted to lug 531 with lift straps 514, as pressure plate 531 is moved towards flywheel 511 drawing pin 551 through cover 521. This movement of pin 551 through cover 521 in a direction towards flywheel 511 is permitted by locking plate 560 and spring 553. When the clutch is disengaged locking plate 560 grips pin 551 to lock pin 551 relative to cover 521 and the constant lift distance L is determined by contact between stop abutments 587A on plate 587 and shoulder 588 on pin 551.

It can be advantageous to arrange to situate a constant lift mechanism or part of a constant lift mechanism between the ends of a lift strap or radially inboard of a fixing device which secures a lift strap to a pressure plate lug. Such a design provides for the circumferential extend of each lift strap and constant lift mechanism combination to be compact.

It should be noted that in the constant lift mechanism 50 sensing pin 55 is offset from the adjustment pin 51 and both sensing pin 55 and adjustment pin 51 are offset from the stop abutments (i.e. flanks 58).

In the constant lift mechanism 250 the sensing pin 255 is offset from the adjustment pin 251. However the stop abutment (i.e. sensing pin head 284) is in line with the sensing pin 255. An advantage of a constant lift mechanism in which at least one of the sensing pin or stop abutment or adjustment pin is offset from another of the sensing pin or stop abutment or adjustment pin is that it provides for an axially compact arrangement especially when the constant lift mechanism is located at a radially outer portion of an automobile clutch where axial space is restructed.

Furthermore such an arrangement allows for the adjustment pin to additionally secure an associated lift strap to the pressure plate.

The invention is not restricted to automatically adjusting clutches but can be used on for example the intermediate pressure plate of a twin plate clutch to ensure that when the clutch is released the intermediate pressure plate does not lift so far as to contact the friction facings of the driven plate which is situated between the pressure plate and intermediate pressure plate and cause poor disengagement.

What is claimed is:

1. A clutch cover assembly for a friction clutch comprising a clutch cover attachable to an associated flywheel, a pressure plate non-rotatably attached to the cover and at least one spring acting on the pressure plate in use to force an associated driven plate into frictional engagement with the associated flywheel, the associated driven plate having friction facings which are subject to wear due to repeated engagement and disengagement of the clutch, the pressure plate being attached to the clutch cover by a plurality of lift straps which act in use to move the pressure plate away from the associated driven plate when the clutch is disengaged, the cover assembly also including at least one constant lift mechanism comprising a stop which is axially adjustable in response to wear of the friction facings of the associated driven plate and which contacts an abutment on one of the pressure plate or an axially fixed component of the clutch over assembly to limit movement of the pressure plate away from the associated driven plate to substantially the same amount during each full disengagement of the clutch, a part of the at least one constant lift mechanism securing a part of a respective lift strap to the pressure plate.

2. A clutch as defined in claim 1 in which the at least one constant lift mechanism further comprises a sensing device, a pin and a one way locking device acting on the pin, in use the sensing device acts to sense wear of the friction linings of the associated driven plate and co-operates with the locking device sc as to permit movement of the stop in a first axial direction following wear of the friction facings of the associated driven plates the one way locking device preventing movement of the stop in a second axial direction opposite to the first.

3. A clutch as defined in claim 2 in which the sensing device acts to sense wear in use by contact with the associated flywheel and the pin is fixed relative to the pressure plate.

4. A clutch cover assembly for a friction clutch comprising a clutch cover attachable to an associated flywheel, a pressure plate non-rotatably attached to the cover of the pressure plate and at least one spring acting on the pressure plate in use to force an associated driven plate into frictional engagement with the associated flywheel, the associated driven plate having friction facings which are subject to wear following repeated engagement and disengagement of the clutch, the pressure plate being attached to the cover by a plurality of lift straps attached to respective radially outwardly projecting lugs, the lift straps acting in use to move the pressure plate away from the associated driven plate when the clutch is disengaged, the cover assembly also including at least one constant lift mechanism comprising a stop which is axially adjustable in response to wear of the friction facings of the associated driven plate and which contacts an abutment on one of the pressure plate or an axially fixed component of the clutch cover assembly to limit movement of the pressure plate away from the associated driven plate to substantially the same amount during each full disengagement of the clutch, at least a part of the at least one constant lift mechanism being fixed to a respective one of the lugs of the pressure plate.

5. A clutch cover assembly for a fiction clutch comprising a clutch cover attachable to an associated flywheel, a pressure plate non-rotatably attached to the cover and at least one spring acting on the pressure plate in use to force an associated driven plate into frictional engagement with the associated flywheel, the associated driven plate having friction facings which are subject to wear due to repeated engagement and disengagement of the clutch, the pressure plate being attached to the clutch cover by a plurality of lift straps which act in use to move the pressure plate away from the associated driven plate when the clutch is disengaged, the cover assembly also including at least one constant lift mechanism comprising a stop which is axially adjustable in response to wear of the friction facings of the associated driven plate and which contacts an abutment on one of the pressure plate or an axially fixed component of the clutch cover assembly to limit movement of the pressure plate away from the associated driven plate to substantially the same amount during each full disengagement of the clutch, at least a part of the at least one constant lift mechanism being concentric with a fixing device which secures a part of an associated lift strap to the pressure plate.

6. A clutch cover assembly for a friction clutch comprising a clutch cover attachable to an associated flywheel, a pressure plate non-rotatably attached to the cover and at least one spring acting on the pressure plate in use to force an associated driven plate into frictional engagement with the associated flywheel, the associated driven plate having friction facings which are subject to wear due to repeated engagement and disengagement of the clutch, the pressure plate being attached to the clutch cover by a plurality of lift straps which in use act to move the pressure plate away from the associated driven plate when the clutch is disengaged, the cover assembly also including at least one constant lift mechanism comprising a stop which is axially adjustable in response to wear of the friction facings of the associated driven plate and which contacts an abutment on one of the pressure plate or an axially fixed component of the clutch cover assembly to limit movement of the pressure plate away from the associated driven plate to substantially the same amount during each full disengagement of the clutch, at least a part of the at least one constant lift mechanism being situated radially inboard of a fixing device which secures a respective adjacent lift strap to the pressure plate.

7. A clutch cover assembly comprising a clutch cover attachable to an associated flywheel, a pressure plate non-rotatably attached to the cover and at least one spring acting on the pressure plate in use to force an associated driven plate into frictional engagement with the associated flywheel, the associated driven plate having friction facings which are subject to wear due to repeated engagement and disengagement of the clutch, the pressure plate being attached to the clutch cover by a plurality of lift straps which in use act to move the pressure plate away from the associated driven plate when the clutch is disengaged, the cover assembly also including at least one constant lift mechanism comprising a stop which is axially adjustable in response to wear of the friction facings of the associated driven plate and which contacts an abutment on one of the pressure plate or an axially fixed component of the clutch cover assembly to limit movement of the pressure plate away from the associated driven plate to substantially the same amount during each fill disengagement of the clutch, at least a part of the at least one constant lift mechanism being situated between the ends of an associated lift strap.

8. A clutch cover assembly for a friction clutch comprising a clutch cover attachable to an associated flywheel, a pressure plate non-rotatably attached to the cover and at least one spring acting on the pressure plate in use to force an associated driven plate into frictional engagement with the associated flywheel, the associated driven plate having friction facings which are subject to wear in response to repeated engagement and disengagement of the clutch, The cover assembly also including at least one constant lift mechanism comprising a stop which contacts an abutment on one of the pressure plate or an axially fixed component of the cover assembly to restrict movement of the pressure plate away from the associated flywheel during clutch disengagement, the constant lift mechanism further comprising a sensing device, a pin, and a one way locking device which acts on the pin, the arrangement being such that in use the sensing device acts to sense wear of the friction facings of the associated driven plate and co-operates with the one way locking device to allow axial movement of the stop in a first direction when said wear is sensed, the one way locking device preventing axial movement of the stop in a second direction opposite to the first.

9. A clutch cover assembly as defined in claim 8 in which the pin is offset relative to the sensing device.

10. A clutch cover assembly as defined in claim 8 in which the one way locking device comprises a locking plate having a hole through which the pin extends and spring means acting to tilt the locking plate relative to the pin such that an edge of the hole grips the pin to prevent relative axial movement of the between the locking plate and the pin.

11. A clutch cover assembly as defined in claim 10 in which the spring means comprises a coil spring.

12. A clutch cover assembly as defined in claim in which in use following wear on the friction linings of the associated driven plate, the sensing means opposes the tilting action of the spring means on the locking plate such that the edge of the hole in the locking plate no longer grips the pin to allow relative movement between the pin and the locking plate in at least one axial direction.

13. A clutch cover assembly as defined in claim 12 in which the pin comprises the sensing device and the stop.

14. A clutch cover assembly as defined in claim 13 in which the pin is mounted on the clutch cover, a first end of the pin including a sensing device in the form of a head which contacts an abutment carried by the pressure plate when the clutch is engaged such that in use the pin is drawn towards the associated flywheel when wear has taken place on the friction facings of the associated driven plate, the pin also having a stop in the form of an abutment which is contacted by pressure plate when the clutch is disengaged to limit movement of the pressure plate.

15. A clutch cover assembly as defined in claim 13 in which the pin is slidably mounted to the pressure plate, the arrangement being such that in use a first end of the pin contacts the associated flywheel when the clutch is engaged such that the pin is moved axially relative to the pressure plate in a direction towards the clutch cover as a result of wear of the friction facings of the associated driven plate, a second end of the pin comprising the stop.

16. A clutch as defined in claim 12 in which the sensing device includes a sensing pin connected with a sensing plate, the sensing plate also having a hole through which the pin extends, the spring means being arranged to act between the sensing plate and the locking plate, the arrangement being such that the sensing pin, sensing plate, spring means and locking plate all move relative to the pin in use when wear of the friction linings of the associated driven plate is sensed but are prevented from moving relative to the pin during clutch disengagement.

17. A clutch cover as defined in claim 16 in which the spring means comprises a plate having a generally "U" shaped resilient tab portion.

18. A clutch cover assembly as defined in claim 16 in which the sensing pin has a first end which in use contacts the associated flywheel when the clutch is engaged, the arrangement being such that following wear of the friction facings of the associated driven plate, contact between the first end of the sensing pin and the associated flywheel on clutch engagement results in an axial displacement of the sensing pin such that the pin opposes the tilting action of the spring means on the locking plate allowing the locking plate, sensing pin, and sensing plate to move axially relative to the pin.

19. A clutch cover assembly as defined in claim 18 in which the stop is provided on a second end of the sensing pin.

20. A clutch cover assembly as defined in claim 18 in which the stop is provided on the sensing plate.

21. A clutch cover assembly as defined in claim 18 in which the sensing pin is slidably mounted in a bore in the pressure plate so as to be axially moveable relative to the pressure plate.

22. A clutch cover assembly as defined in claim 16 in which the sensing pin is offset from the hole in the locking plate.

23. A clutch cover assembly as defined in claim 8 in which the pressure plate is attached to the clutch cover by a plurality of lift strap members, the at least one constant lift mechanism also being attached to the pressure plate with a part of the at least one constant lift mechanism attaching one end of a respective lift strap member to the pressure plate.

24. A clutch cover assembly as defined in claim 23 in which the pin attaches one end of a respective lift strap to the pressure plate.

25. A clutch cover as defined in claim 24 in which the pin comprises a rivet used to attach one end of a respective lift strap to the pressure plate.

26. A clutch cover as defined in claim 24 in which the pin comprises two components joined by a threaded fastening.

27. A clutch cover assembly as defined in claim 8 further comprising an adjustment device to automatically compensate in use for wear of the friction linings of the associated driven plate.

28. A clutch cover assembly as defined in claim 8 in which the pressure plate is an intermediate pressure plate, the clutch cover assembly comprising a further pressure plate such that in use tae spring acts on the intermediate pressure plate via the further pressure plate and a further associated driven plate.

29. A clutch cover assembly as defined in claim 8 in which the abutment is provided on the clutch cover.

* * * * *